Patented July 12, 1932

1,867,202

UNITED STATES PATENT OFFICE

GEORGE BARNHART, OF SALEM, NEW JERSEY, ASSIGNOR TO E. I. DU PONT DE NEMOURS & COMPANY, OF WILMINGTON, DELAWARE, A CORPORATION OF DELAWARE

BLUE SULPHUR COLOR AND PROCESS OF MAKING THE SAME

No Drawing. Application filed January 13, 1926. Serial No. 81,106.

This invention relates to the manufacture of a blue dye. More particularly, it is concerned with a blue sulphur dye and the process of its manufacture from dinitro-hydroxy-diphenylamine. The formula of hydroxy-dinitro-diphenylamine is

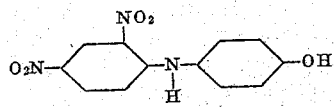

This compound may be prepared by the condensation of p-amino-phenol,

and 1:2:4 chlor-dinitro-benzene

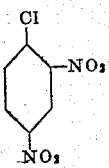

One object of my invention is the production of a color of bright shade and superior solubility. Another object is the avoidance of complicated and expensive methods of production. Still another object is to obtain a high yield of the final product.

To those skilled in the art, it is well known that the process of producing sulphur colors of the type described comprises heating the intermediate with a solution of sodium polysulphide. For example, in the manufacture of direct blue from dinitro-hydroxy-diphenylamine, it is the common practice either to partially thionate and then remove or destroy by chemical means the material and by-products which do not readily form the desired color, or to completely thionate and isolate the color forming material before subjecting it to a further treatment which will transform it into the desired product.

By the new process of my invention the necessity for these steps is eliminated. Not only is a complete thionation effected, but also, the product is not isolated until the color formation is complete. Thus, depending upon which of these two processes has been followed, the loss of yield due to incomplete thionation is avoided or the step of isolating the thionated but partially completed color is eliminated.

In carrying my process into effect I may as indicated above, for example, prepare the intermediate by the condensation of p-amino phenol and 1,2,4-chlor-dinitro-benzol. The resulting 2,4-dinitro-4'-hydroxy-diphenylamine is subjected to the usual step of reduction, but with an unusually large amount of sodium polysulphide. The thionation of the mass is subsequently effected by continuing the heating. The thionation, however, is accomplished at a higher temperature than usual, which temperature is obtained by subjecting the charge to a pressure of 6 to 8 lbs. per square inch. By this means a temperature of 120–122° C. is readily obtained. The high temperature and the unusual quantities of sulphide cooperate to facilitate thionation. The heating is continued until the thionation is complete. The resulting mass is then treated with caustic soda, diluted with much water, and developed by oxidation with air. It is only necessary to filter and dry the oxidized mass to obtain the desired product. The small quantity of by-products produced in the process is removed in the filtrate.

In order to present my process in detail, an example of an actual embodiment thereof is furnished below. It is to be understood of course that such example is purely illustrative and that I am limited in no way to the particular conditions therein set forth.

A quantity of 2,4-dinitro-4'-hydroxy-diphenylamine, 1.0 part (by weight), is suspended in 2 parts (by weight) of water in a vessel provided with an agitator and arranged to discharge into a fusion kettle. In the fusion kettle is charged a 40% to 50% aqueous solution of sodium polysulphide containing 2.2 parts of $Na_2S_5$ (approximately). The polysulphide solution is heated to 90–95° C. The heat is then turned off and the gradual charging of the suspension of 2,4-dinitro-4'- hydroxy-diphenylamine into the kettle is begun. The reaction or reduction causes a rapid rise in temperature, and when the boiling point is reached the rate of addition of the intermediate is so regulated as to maintain a vigorous boiling. When the 2,4-dinitro-4'-hydroxy-diphenylamine is all added and the reduction complete, external heat is applied again and the charge is evaporated until a boiling point of 112° C. (approximately) is obtained. The kettle is then closed and the pressure and temperature are allowed to rise to 6-8 lbs. and 120-122° C. respectively. The heating is continued, the water evaporated being returned to the charge by a reflux condenser, until the reaction is complete. This point is determined by comparing the shade with that of a standard fusion. The charge is then cooled until the pressure falls, the kettle is opened, the charge diluted with water and treated with caustic soda in an amount generally ranging from 0.5 to 1.0 part by weight, as compared to the original 1 part of intermediate. The charge is then diluted to 40 or 50 parts and oxidized by blowing with air until the desired shade is obtained. The color is then filtered off and dried.

My new process has many advantages, among which is the fact that a high yield of a product of superior solubility is obtained. The process also, insofar as it accomplishes the final development of the color without the step of isolating the material not suitable for use, is in the nature of a simplification of the old process. Also, apparently by reason of the treatment with the caustic prior to oxidation, a color of unusually bright shade is secured.

I claim:

1. In the process of producing a blue sulphur dye by thionating dinitro-hydroxy-diphenylamine, the step which comprises treating the product of the thionation with caustic soda prior to oxidation.

2. The process of producing a blue sulphur dye which comprises thionating 2,4-dinitro-4'-hydroxy-diphenylamine, adding to the thionated mass a solution comprising caustic soda and then passing air through the resulting liquid.

3. The process of producing a blue sulphur dye which comprises effecting the thionation of 2,4-dinitro-4'-hydroxy-diphenylamine by heating the same together with sodium polysulphide to a temperature as high as 120° C., adding to the thionated mass a solution comprising caustic soda and then passing air through the resulting liquid.

4. The process of producing a blue sulphur dye which comprises effecting the thionation of 2,4-dinitro-4'-hydroxy-diphenylamine by heating the same together with an aqueous solution of sodium polysulphide to a temperature as high as 120° C., said heating being carried out under a pressure of from 6 to 8 lbs., adding to the thionated mass a solution comprising caustic soda and then passing air through the resulting liquid.

5. The process of producing a blue sulphur dye from the intermediate dinitro-hydroxy-diphenylamine, which comprises heating together at least 2 parts of sodium polysulphide and 1 part of the intermediate until thionation is effected, treating the thionated mass with a solution containing from 0.5 to 1.0 part of caustic soda and blowing air through the resulting liquid.

6. In the process of producing a blue sulphur dye by thionating dinitro-hydroxy-diphenylamine, the method which comprises developing the shade of the thionated products by oxidation in the presence of substantial quantities of water after treatment with an alkali metal hydroxide and prior to the separation of by-products.

7. The process of producing a blue sulphur dye which comprises thionating 2,4-dinitro-4'-hydroxy-diphenylamine, treating the product with caustic soda, developing the color by oxidation, filtering to separate by-products and drying.

8. As a new product the dye substantially identical with the blue sulphur dye obtainable by thionating dinitro-hydroxy-diphenylamine, treating the product of the thionation with caustic soda, and thereafter oxidizing the resultant.

9. A blue sulphur dye obtained by thionating dinitro-hydroxy-diphenylamine in the presence of substantial quantities of water, adding caustic soda to the thionation mass, and developing the finished dye by oxidation with air prior to separating the material which does not enter into the dye compound.

10. A blue sulphur dye obtained from 2,4-dinitro-4'-hydroxy-diphenylamine by thionating, treating with caustic soda, developing the color by oxidation and lastly separating the material which does not enter into the dye compound.

11. A blue sulphur dye obtained from 2,4-dinitro-4'-hydroxy-diphenylamine by thionating said compound by heating it together with sodium polysulphide to a temperature as high as 120° C., adding to the thionated mass a solution comprising a hydroxide of an alkali metal, passing air through the resulting liquid to develop the shade, and lastly separating the material which does not enter into the composition of the dye.

12. A blue sulphur dye obtained from 2,4-dinitro-4'-hydroxy-diphenylamine by effecting thionation of said compound, said dye having the characteristics obtained by treating the product of said thionation with caustic soda, and thereafter oxidizing said product.

13. A blue sulphur dye intermediate obtained from 2,4-dinitro-4'-hydroxy-diphenylamine by effecting thionation of said compound, said thionation being effected by heating under from 6 to 8 lbs. pressure and to at least 120° C. an aqueous mixture of approximately 2 parts of sodium polysulphide together with 1 part of said diphenylamine.

14. A blue sulphur dye having substantially the properties of the dye produced by adding one part of 2:4-di-nitro-4'-hydroxy-di-phenyl-amine to 2.2 parts of sodium sulphide of the formula $Na_2S_5$ in the form of a 40 to 50% aqueous solution heated to 90–95° C., evaporating until a boiling point of 112° C. is reached thereafter carrying out further heating under pressure so that the temperature rises to 120–122° C., continuing the heating at this temperature until the reaction is complete, removing the pressure, diluting with water, adding 0.5 to 1.0 parts of caustic soda, diluting to 40–50 parts and by blowing with air to precipitate the dye.

15. A blue sulphur dye obtained from 2:4-di-nitro-4'-hydroxy-di-phenyl-amine by thionating said compound by heating it together with sodium polysulphide to a temperature as high as 120° C. under a pressure of from 6 to 8 pounds, adding to the thionated mass a solution comprising a hydroxide of an alkali metal, passing air through the resulting liquid to develop the desired shade and lastly separating the material which does not enter into the composition of the dye.

16. A blue sulphur dye obtained from 2:4-di-nitro-4'-hydroxy-di-phenyl-amine by thionating said compound by heating it together with sodium polysulphide in the ratio of at least two parts of polysulphide to one part of intermediate to a temperature as high as 120° C., adding to the thionated mass a solution comprising a hydroxide of an alkali metal, passing air through the resulting liquid to develop the shade and lastly separating the material which does not enter into the composition of the dye.

17. A blue sulphur dye obtained from 2:4-di-nitro-4'-hydroxy-di-phenyl-amine by thionating said compound by heating it together with a sodium polysulphide of the formula $Na_2S_5$ to a temperature as high as 120° C., adding to the thionated mass a solution comprising a hydroxide of an alkali metal, passing air through the resulting liquid to develop the shade and lastly separating the material which does not enter into the composition of the dye.

18. The process of producing a blue sulphur dye which comprises effecting the thionation of 2:4-di-nitro-4'-hydroxy-di-phenyl-amine by heating the same together with an aqueous mixture of sodium polysulphide having a formula of approximately $Na_2S_5$ to a temperature as high as 120° C., said heating being carried out under a pressure of from 6 to 8 pounds, adding to the thionated mass a solution comprising caustic soda and then passing air through the resulting liquid.

19. The process of producing a blue sulphur dye which comprises effecting the thionation of 2:4-di-nitro-4'-hydroxy-di-phenyl-amine by heating the same together with an aqueous mixture of sodium polysulphide to a temperature as high as 120° C., the amount of sodium polysulphide being equal to at least twice the amount of intermediate, said heating being carried out under a pressure of from 6 to 8 pounds, adding to the thionated mass a solution comprising caustic soda and then passing air through the resulting liquid.

20. In the process of producing a blue sulphur dye by thionating 2:4-di-nitro-4'-hydroxy-di-phenyl-amine, the step which comprises treating the product of the thionation with caustic soda prior to oxidation.

21. A blue sulphur dye obtained by thionating di-nitro-hydroxy-di-phenylamine and treating the product of the thionation with caustic soda prior to oxidation.

22. The process of producing a blue sulphur dye which comprises thionating 2,4-dinitro-4'-hydroxy-diphenylamine, treating the product with an alkali metal hydroxide, developing the color by oxidation and filtering to separate by-products.

In testimony whereof I affix my signature.

GEORGE BARNHART.